United States Patent [19]

Spaulding

[11] Patent Number: 4,963,733
[45] Date of Patent: Oct. 16, 1990

[54] INCREMENTAL ENCODER
[75] Inventor: Carl P. Spaulding, San Marino, Calif.
[73] Assignee: TRJ & Company, Duarte, Calif.
[21] Appl. No.: 295,660
[22] Filed: Jan. 9, 1989
[51] Int. Cl.$^5$ .............................................. G01D 5/34
[52] U.S. Cl. .......................... 250/231.16; 250/231.17; 250/237 G
[58] Field of Search ........ 250/231 SE, 237 G, 231 R; 356/395; 340/347 P, 13; 324/175; 33/125 C, 707

[56] References Cited
U.S. PATENT DOCUMENTS

| 4,218,615 | 8/1980 | Zinn, Jr. ......................... 250/237 G |
| 4,556,792 | 12/1985 | Kano et al. .................... 250/231 SE |
| 4,628,200 | 12/1986 | Tinios .............................. 25/231 SE |

Primary Examiner—David C. Nelms
Attorney, Agent, or Firm—Christie, Parker & Hale

[57] ABSTRACT

An incremental encoder comprises a rotatable disc having an axis of rotation and a plurality of circumferentially arranged slots formed in the disc at equal angular increments. Light source is so positioned on one side of the disc so as to illuminate the slots. A first light sensor is so positioned on the other side of the disc as to receive light from the source means transmitted through the slots. A second light sensor is so positioned on the other side of the disc farther from the axis than the first sensor so as to receive light from the source transmitted through the slots out of phase with the light transmitted to the first sensor. A third light sensor is so positioned on the other side of the disc as to receive light from the source transmitted through the slots for control purposes. The third sensor lies at the intersection of an arc having a center at the first sensor and a radius equal to the distance between the first and second sensors and an arc having a center at the axis of rotation and a radius equal to the distance between the axis of rotation and a point, preferably the midpoint, between the first and second sensors. A slit plate having a light transmitting aperture is disposed between the light source and the disc. Another slit plate having three slits defining first, second and third light receiving apertures is disposed between the disc and the sensors. The spacing between the first and second light receiving apertures is equal to ¼ the spacing between the slots on the disc times the ratio of the distance between slit plates divided by the distance between the first slit plate and the disc.

25 Claims, 6 Drawing Sheets

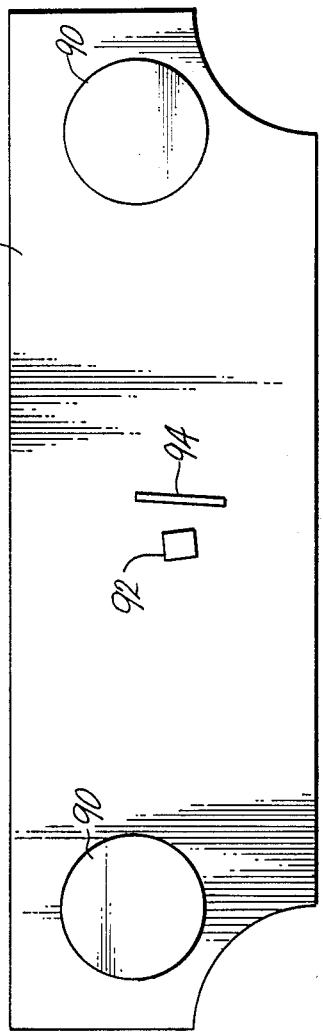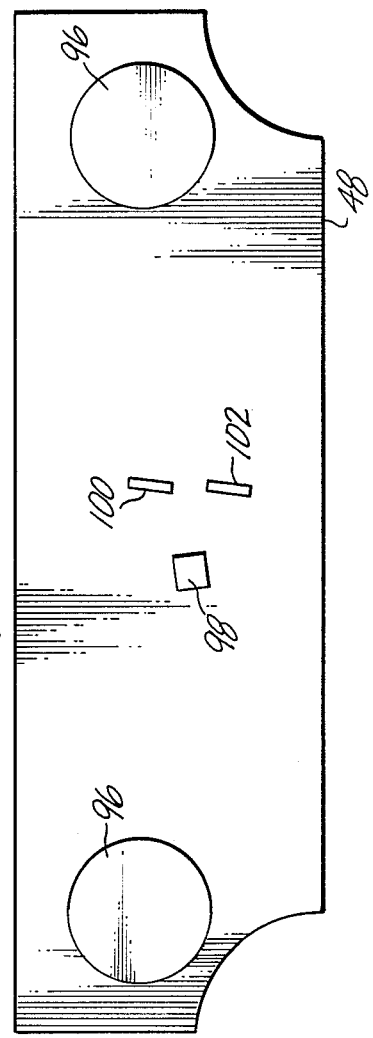

INCREMENTAL ENCODER

BACKGROUND OF THE INVENTION

This invention relates to position transducers and more particularly, to a miniaturized incremental encoder with low power consumption.

An incremental encoder is used to measure the angular displacement of a rotatable shaft. Typically, the incremental encoder comprises a disc having circumferentially arranged slots mounted on the shaft between a plurality of light source-sensors pairs. Each time a slot in the disc passes a light source-sensor pair, the sensor generates an electrical pulse. In the prior art, it is common to space two of the light source-sensor pairs circumferentially such that the sensor outputs are in quadrature phase relationship. The combination of the outputs from these sensors provides four counts as the disc is displaced by an angle equal to the slot spacing. Common practice is to space the two quadrature phase generating light source-sensor pairs apart by an angle greater than the slot spacing. The phasing of the sensor outputs relative to each other represents the direction of the angular displacement and the change of states of the sensor outputs represents the incremental magnitude of the angular displacement. A bi-directional counter is operated responsive to the outputs of the sensors so as to accumulate the displacement representation, taking into account direction, and thereby provide a representation of angular position. It is common to employ a third light source-sensor pair to generate a marker signal that resets the counter and performs other control functions.

Manufacturing tolerances result in a variation of the radial distance from the axis of rotation of the disc to the quadrature phase light source-sensor pairs as the disc rotates. This variation gives rise to a change in phasing between the sensor outputs in direct relationship to the circumferential spacing between the light source-sensor pairs.

In some applications of an incremental encoder, the slots are placed on only part of the circumference of the disc. In such case, the counter does not operate correctly near the ends of a group of slots because one quadrature phase sensor starts to operate a number of counts before the other.

SUMMARY OF THE INVENTION

According to the invention an incremental encoder comprises a rotatable disc having an axis of rotation and a plurality of circumferentially arranged slots formed in the disc at equal angular increments. Light source means defining a light transmitting aperture is so positioned on one side of the disc as to illuminate the slots. First light sensing means defining a first light receiving aperture is positioned on the other side of the disc so as to receive light from the source means transmitted through the slots. Second light sensing means defining a second light transmitting aperture is positioned on the other side of the disc farther from the axis than the first sensor so as to receive light from the source means transmitted through the slots out of phase with the light transmitted to the first sensing means. The spacing between the first and second light receiving apertures is equal to ¼ the spacing between the slots of the disc times a correcting ratio which depends upon the distance between the planes of the light transmitting aperture and the light receiving aperture and the position of the disc therebetween. Specifically, the correcting ratio equals the distance between the planes of the light transmitting and light receiving apertures divided by the distance between the light transmitting aperture and the disc.

Preferably, a third light sensor is so positioned at an angle relative to the first sensor on the other side of the disc as to receive light from the source means transmitted through the slots. The third sensor lies at the intersection of an arc having a center at the first sensor and a radius equal to the distance between the first and second sensors and an arc having a center at the axis of rotation and a radius equal to the distance between the axis of rotation and a point, preferably the midpoint, between the first and second sensors.

According to a feature of the invention, the area of the third sensor is large enough to receive light from two adjacent slots on the disc at the same time. Thus, the output from the third sensor can serve as a fail-safe signal and/or as a control signal to maintain the intensity of the light source means constant, independent of variables such as temperature and aging.

Another feature of the invention is the use of a single directional light source, as the light source means to illuminate all the sensors and slit plates to limit the beams directionally to the desired areas of the disc and the light sensors.

Another feature of the invention is a disc having slots arranged over only a portion of the circumference. The slots are arranged in a group of closely spaced adjacent slots transmitting light to all three sensors and a number of individual slots selectively transmitting light to one or more of the sensors for control purposes and to carry out special functions.

BRIEF DESCRIPTION OF THE DRAWINGS

The features of specific embodiments of the best mode contemplated of carrying out the invention are illustrated in the drawings, in which:

FIG. 6 is top plan view of the upper slit plate of FIG. 2B; and

FIG. 7 is a top plan view of a the lower slit plate of FIGS. 2B and 4B.

DETAILED DESCRIPTION OF THE SPECIFIC EMBODIMENTS

Figure 1:
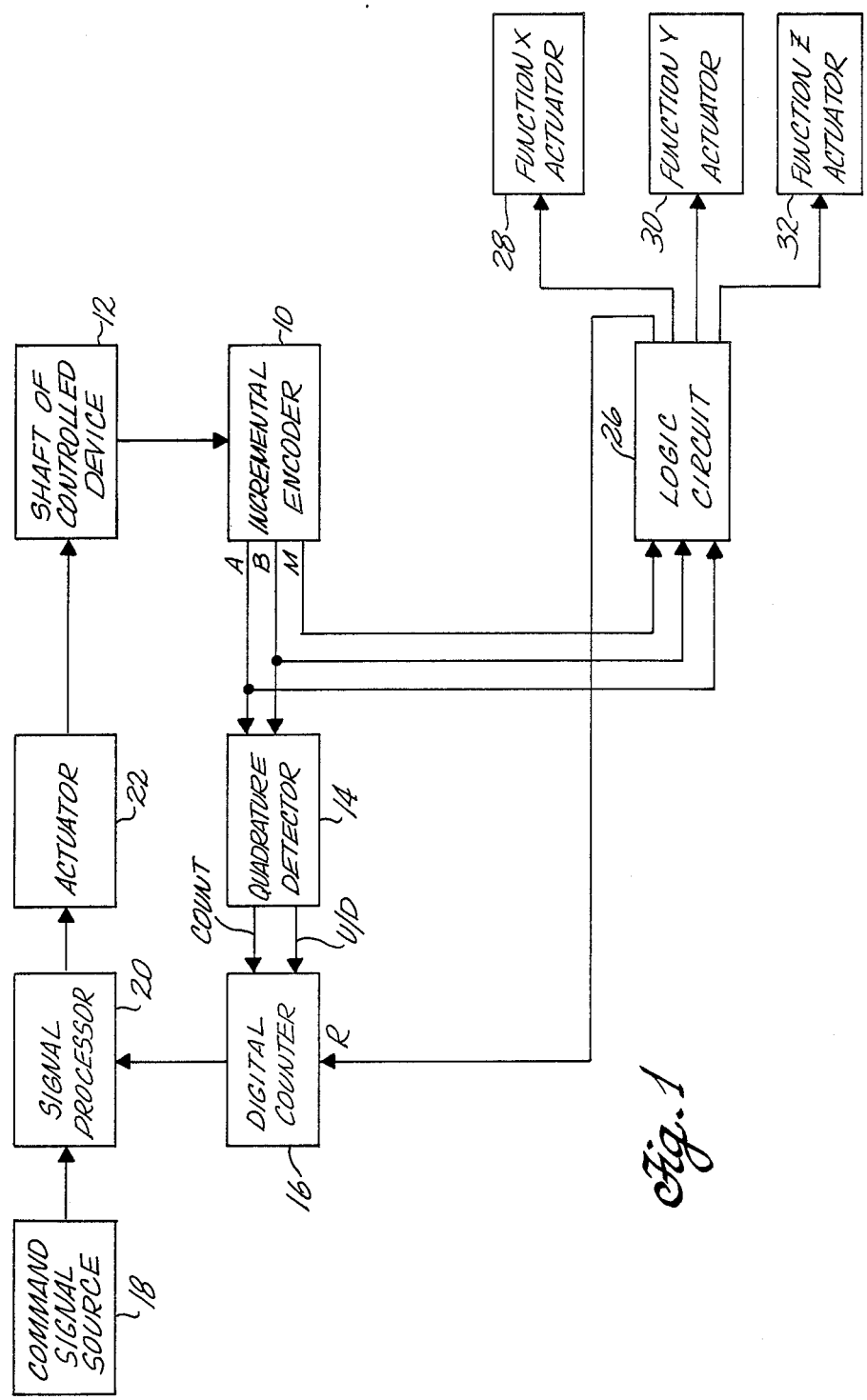
FIG. 1 is a schematic block diagram of a control system employing an incremental encoder.

In FIG. 1, an incremental encoder 10 is coupled to a rotatable shaft 12 of a controlled device. By way of example, the controlled device could be an infusion pump. Several embodiments of encoder 10 are described in detail below. Encoder 10 produces pulses, i.e. binary output signals, A, B, and M. Output signals A and B, which are in quadrature phase relationship, represent displacement of shaft 12. Output signal M is a marker that may be used for various control purposes. Output signals A and B are coupled to a conventional quadrature detector 14. Detector 14 produces a COUNT output signal and a U/D output signal which are coupled to the control inputs of a bi-directional digital counter 16. The COUNT output signal is a series of pulses that increment or decrement the state of counter 16 each time shaft 12 rotates one angular increment, i.e. one count. The U/D output signal is a binary signal that controls the direction of Counter 16, i.e incrementing or decrementing, depending upon the direction of rotation of shaft 12. Thus, the state of counter 16 represents the actual angular position of shaft 12 with respect to a prescribed reference.

A command signal source 18 generates a signal, preferably digital, that represents the desired angular position of shaft 12. Source 18 could comprise an operator controlled input device such as a keyboard or joystick, a pre-programmed signal source or a computer output representative of other system conditions. Command signal source 18 and digital counter 16 are coupled to a signal processor 20 that generates a signal representative of the difference between the actual and the desired shaft positions. Processor 20 could simply comprise a digital comparator that generates a binary signal the value of which depends upon which signal is larger, that from source 18 or that from counter 16. Alternatively, processor 20 could generate a more responsive correction signal, e.g. an analog or digital control signal including a velocity or damping control component. Signal processor 20 is coupled to an actuator 22 which moves shaft 12 to reduce the difference between the actual shaft position as represented by the output signal from counter 16 and the desired shaft position as represented by the output from source 18.

Output signals A, B, and M are also optionally coupled to a logic circuit 26 for the purpose of performing shaft position related functions. One of the outputs from logic circuit 26 is coupled to the reset input of digital counter 16 to re-establish the reference position of shaft 12, to a function X actuator 28, to a function Y actuator 30 and to a function Z actuator 32. The logical operations performed by logic circuit 26 depend upon the slot positions on the disc of incremental encoder 10, the light sensor positions relative to the slots on the encoder disc and the shaft positions at which the respective functions are to be performed. One function which could be performed, for example, by actuator 28 is to actuate an alarm when logic circuit 26 detects the absence of output signal M, which represents a failure of the light source of encoder 10.

Figure 2A:
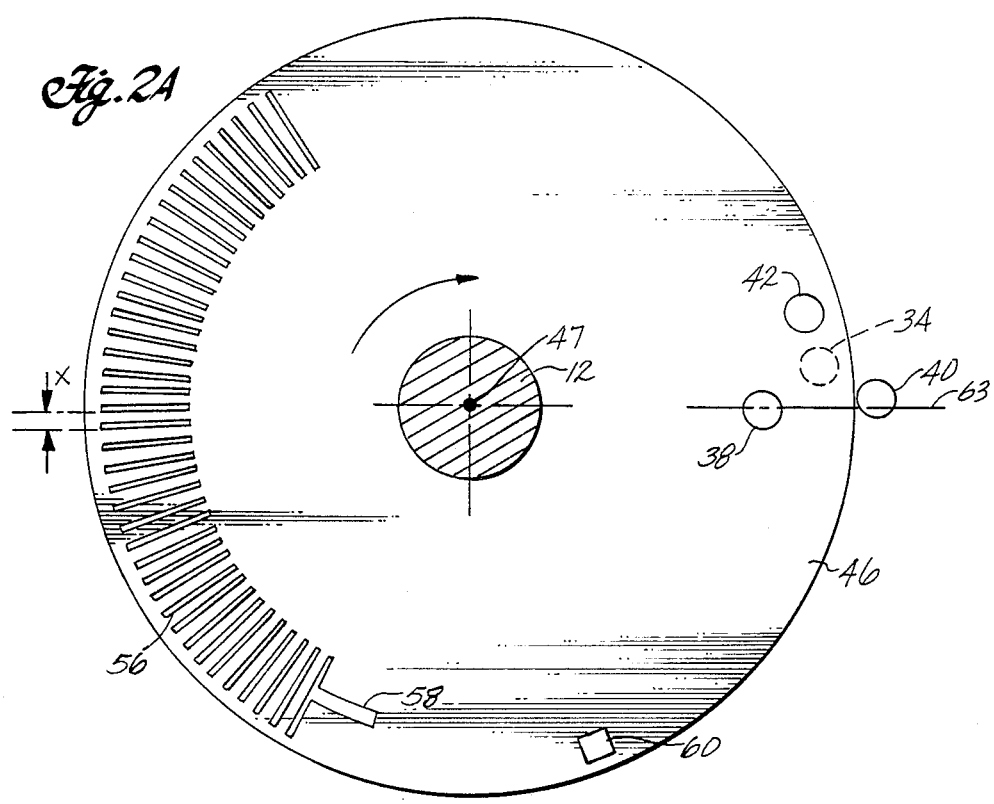
FIGS. 2A and 2B are a bottom plan and side elevation view, respectively, of one embodiment of an incremental encoder incorporating principles of the invention.
Figure 2B:
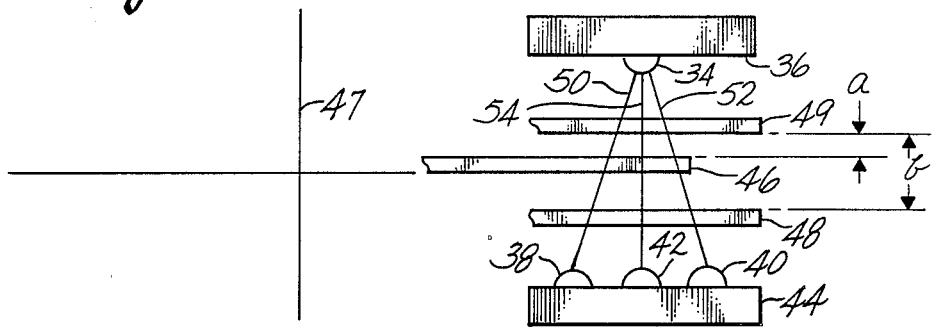

One embodiment of encoder 10 is shown in detail in FIGS. 2A and 2B. A light source 34 is mounted on a circuit board 36 together with an electrical energy source, e.g., a battery. Light sensors 38, 40 and 42 are mounted on a circuit board 44 so as to face light source 34. A disc 46 is fixedly mounted on shaft 12 to rotate therewith. Disc 46 has an axis of rotation 47 that coincides with the axis of shaft 12. Disc 46 has a circumferential arrangement of slots passing through it. A slit plate 48 is disposed between disc 46 and circuit board 44. Slit plate 48 has three slits 98, 100, and 102 (FIG. 7) so arranged relative to the slots on disc 46 and light sensors 38, 40 and 42 to improve the directivity of the light transmitted by light source 34 to the light sensors, as depicted by light rays 50, 52 and 54. Slits 100 and 102 define light receiving apertures for sensors 40 and 38, respectively. A slit plate 49 is disposed between light source 34 and disc 46. Slit plate 49 has two slits 92 and 94 (FIG. 6) also arranged to improve the directivity of the light transmitted by light source 34 to the sensors. Slit 94 defines a light transmitting aperture. Disc 46 has a group of radially elongated slots 56 arranged around only a portion of the circumference at equal angular increments relative to axis 47. The radial elongation of group of slots 56 is sufficient to couple light from source 34 to all three of sensors 38, 40 and 42. Although the described encoder is able to detect rotational displacement in both directions, the usual direction of rotation is clockwise, as illustrated by the arrow in FIG. 2A. In a usual clockwise direction of rotation, sensor 42 provides an anticipatory signal which could be used to slow down the disc speed or to generate a conditioning signal for the electronics driven by the encoder. The slot at the trailing end of group 56 has a centrally located radially elongated extension 58 located in the path of light from source 34 to sensor 42. The radial elongation of extension 58 is such that light transmission to sensor 42 ends after light transmission to sensors 38 and 40, as the trailing end of group 56 approaches light source 34. This ensures that sensor 42 receives light during the entire time that sensors 38 and 40 are detecting incremental angular displacement. (For an encoder designed to rotate normally in both directions, extension 58 would have to be lengthened circumferentially to provide an anticipatory signal for counter-clockwise rotation. Disc 46 also has a single radially compressed slot 60 spaced a distance away from the end of group 56. The signal generated by sensor 40 as a result of slot 60 can be used to reset counter 16 and/or otherwise condition the electronics driven by the encoder.

Figure 3:
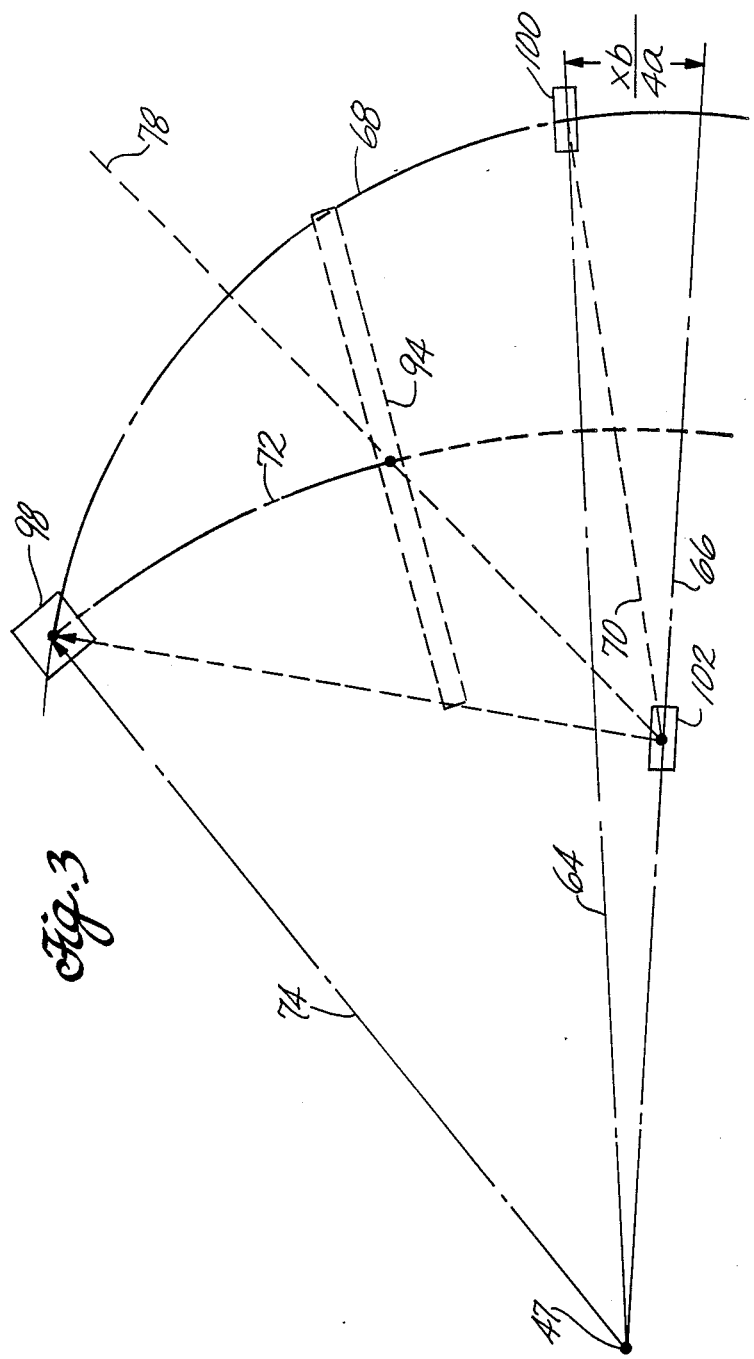
FIG. 3 is an enlargement of the source and sensors of FIGS. 2A and 2B illustrating the relative positioning therebetween.

The angular increment between the slots of group 56 is designated as X in FIG. 2A. As illustrated in FIG. 3, the light receiving aperture of sensor 40, i.e., slit 100, lies on an imaginary radial line 64 through axis 47 that forms an angle of ¼ the angular increment between slots multiplied by the ratio of b/a (where b is the distance between slit plates 48 and 49, and a is the distance between disc 46 and slit plate 49), i.e., Xb/4a, with respect to a radial line 66 through axis 47, on which the light receiving aperture of sensor 38, i.e., slit 102, lies. The need for the correcting ratio of b/a arises because of the slant of the light beam from the single light transmitting aperture being radiated through the slots on disc 46 into two light receiving apertures. In essence, the light beams for two positions of disc 46 are further apart in the plane of the light receiving apertures than in the plane of the slots on disc 46.

As shown, sensor 42 and slot 98 are positioned at an angle about axis 47 relative to sensors 38 and 40 and slots 100 and 102. Sensors 38, 40 and 42 are placed as close together as possible to obtain maximum illumination from a single light source. Thus, the spacing between sensors 38 and 40 is governed by their physical size. Sensor 42 and slot 98 are centered at the crossing of two arcs. One arc, designated 68, has a center at the center of slot 102 and a radius 70 equal to the distance between the centers of slots 100 and 102. Radius 70 represents the closest spacing between sensors 38 and 40 and their slits that their physical size will permit. The other arc, designated 72, has a center coinciding with axis 47 and a radius 74 equal to the distance between axis 47 and a point between slots 100 and 102. Sensor 42 and slot 98 are located on an arc between slots 100 and 102 so that light transmitted through the slots will reach slot 98 and sensor 42. Preferably, radius 74 equals the distance between axis 47 and the midpoint between slots 100 and 102, as illustrated in FIG. 3. This provides the best isolation between sensors 38 and 40 and sensor 42, so that sensor 42 can be selectively used for control purposes or to perform other functions as described herein. The illuminated area of sensor 42 due to slot 98 is large enough to receive light from two adjacent slots on disc 46 at the same time.

Source 34 and slot 94 are centered at the crossing of a line 78 which bisects the angle formed between slots 100 and 102 with slot 102 as the origin and arc 72. Thus, source 34 is approximately equidistant from all three of sensors 38, 40 and 42 and their slits.

Figure 4A:
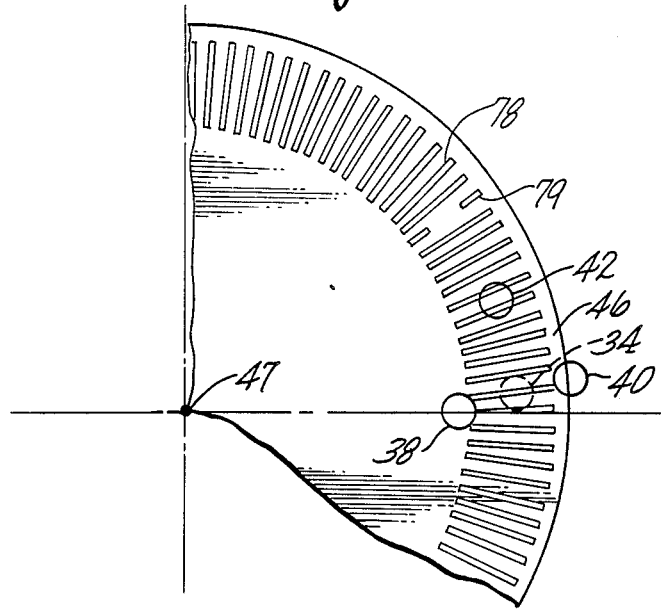
FIGS. 4A and 4B are bottom plan and side elevation views, respectively, of another embodiment of an incremental encoder incorporating principles of the invention.
Figure 4B:
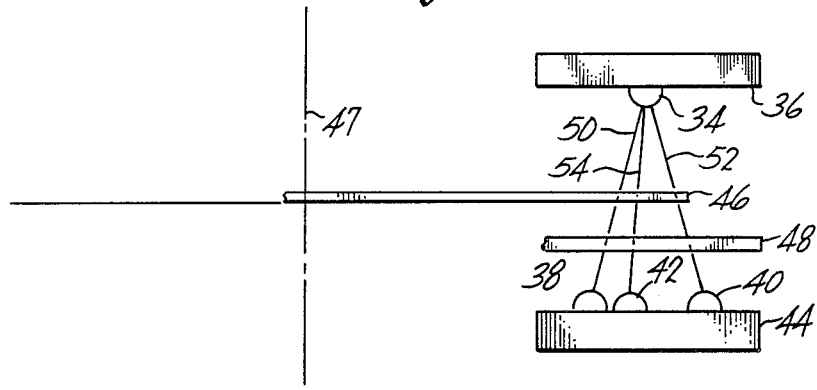

In the embodiment of FIGS. 4A and 4B like components bear the same reference numerals. This embodiment illustrates several optional modifications that may be separately or jointly employed. First, only a single slit plate 48 is provided between disc 46 and sensors 38, 40 and 42. (Slit plate 49 is omitted and source 34 itself defines the light transmitting aperture. In this case, is the distance between source 34 and disc 46 and b is the distance between source 34 and slit plate 48.) Second, instead of being located equidistant from all three sensors and their slits, source 34 is located at the mid-point of an imaginary line between slots 100 and 102, because sensors 38 and 40 require higher resolution and therefore more light than sensor 42. Third, disc 46 has a continuous pattern of radially elongated slots 78 arranged all around its circumference. One of the slots designated 79 is interrupted in its mid-region to define a reference position. The light path between source 34 and sensor 42 is designed so that the light transmission to sensor 42 is interrupted as slot 79 rotates therebetween. This provides a signal to reset counter 16 when disc 46 passes through the reference position. In this embodiment, sensor 38, 40 and 42 and their slits are positioned as described above in connection with FIG. 3.

Figure 5:
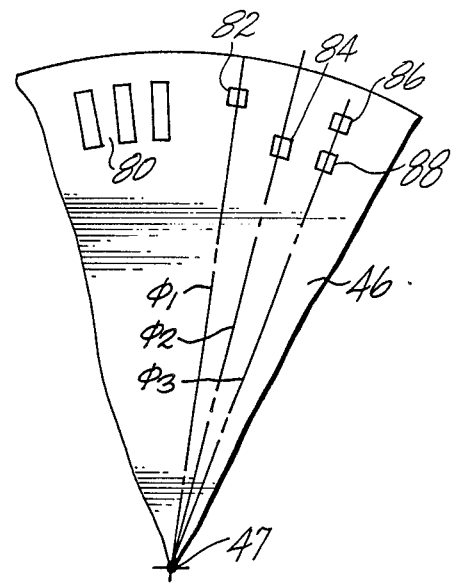
FIG. 5 is a top plan view of part of a modification to the slot pattern shown in FIG. 2A or FIG. 3A.

In FIG. 5 is shown, an alternative arrangement of slots for disc 46 which enables performance of various functions, i.e. functions X, Y and Z (FIG. 1). A group of radially elongated slots 80 is arranged around only a portion of the circumference of disc 46. Radially compressed slots 82, 84 and 86 are arranged along the circumference of disc 46 at various angular positions designated $\phi_1$, $\phi_2$, and $\phi_3$. Slots 86 and 88 are radially aligned relative to axis. Slots 82 and 86 are arranged to couple light from source 34 to sensor 40 without coupling light to sensors 38 and 42. Slots 84 and 88 are arranged to couple light from source 34 to sensor 38 without coupling light to sensors 40 and 42. At position $\phi_1$, sensor 40 is energized and sensors 38 and 42 are not energized. This set of conditions is sensed by logic circuit 26 (FIG. 1) and a command signal is sent to function X actuator 28. At position $\phi_2$, sensor 38 is energized and sensors 40 and 42 are not energized. This condition is detected by logic circuit 26 and a command signal is sent to function Y actuator 30. At position $\phi_3$, sensors 38 and 40 are energized and sensor 42 is not energized. This condition is sensed by logic circuit 26 and a command signal is sent to function Z actuator 32. Similarly, various other disc positions could be sensed by logic circuit 26 to initiate other functions, depending upon disc position by providing various combinations and/or sequences of slots to actuate selectively sensors 38, 40 and 42.

In the preferred embodiment the slits are sized so the width of illumination of sensors 38 and 40 and the width of the illumination of disc 46 by source 34 are approximately equal to $\frac{1}{4}X$, i.e. $\frac{1}{4}$ of the angular increment between slots.

In FIG. 6 a typical embodiment of slit plate 49 is shown. Slit plate 49 has mounting holes 90 and slits 92 and 94. Slit 92 is radially compressed to transmit light from source 34 to sensor 42 to the exclusion of sensors 38 and 40. Slit 94 is radially elongated to transmit light from source 34 to sensors 38 and 40. Typical angular widths and width spacing relative to the width of slot 94 are as follows: spacing between 92 and 94—two times the width of slit 94; width of slit 92—three times the width of slit 94.

In FIG. 7 a typical embodiment slit plate 48 is shown. Slit plate 48 has mounting holes 96 and slits 98, 100 and 102. Slit 98 is positioned and dimensioned to couple light from source 34 only to sensor 42. Slit 100 is dimensioned and positioned to transmit light from source 34 only to sensor 40. Slit 102 is dimensioned and positioned to transmit light from source 34 only to sensor 38. Typical angular widths and width spacing relative to slit 102 are as follows: slit 100—the same width as slit 102, slit 98—four times the width of slit 102; spacing between slits 100 and 98—approximately six times the width of slit 102. The clockwise edge of slit 100 is approximately on the same radial line as the counterclockwise edge of slit 102.

Although it is preferable to employ slit plates 48 and 49, another embodiment of the invention not shown eliminates both slit plates. In this case, source 34 defines the light transmitting aperture and sensors 98, 100 and 102 define the light receiving apertures; a is the distance between source 34 and disc 46 and b is the distance between source 34 and the plane of sensors 98, 100, and 102.

The light source-sensor arrangement of FIGS. 2A and 2B could be employed with the slot arrangement of FIGS. 4A and 4B or FIG. 5. Similarly, the light source-sensor arrangement of FIGS. 4A and 4B could be employed with other slot arrangements including those disclosed herein.

The described embodiments of the invention are only considered to be preferred and illustrative of the inventive concept; the scope of the invention is not to be restricted to such embodiments. Various and numerous other arrangements may be devised by one skilled in the art without departing from the spirit and scope of this invention. For example, although the embodiment of FIG. 4B discloses only a slit plate on one side of the disc, slit plates on both sides of the disc as illustrated in FIG. 2B is preferred because a factor of two or three times better resolution results. In general, the invention calls for the application of a correcting ratio to the spacing between light receiving apertures for the light sensing means that generate quadrature phase output signals in an incremental encoder illuminated by a single light transmitting aperture. This ratio is the distance between planes in which the light transmitting aperture of the light source means and the plane of the light receiving apertures of the light sensing means, divided by the distance between the plane of the light transmitting aperture and the disc. If the light transmitting means comprises a light source and a slit plate as in the preferred embodiment, the plane of the light transmitting aperture is the plane of the slit plate. However, if the light source means comprises a light source without a slit plate, the plane of the light transmitting aperture is the plane of the light source. Similarly, if the light sensing means comprises a slit plate and light sensors as in the preferred embodiment, the plane of the light receiving aperture is the plane of the slit plate. But if the light receiving means comprises light sensors without a slit plate, the plane of the light receiving apertures is the plane of the light sensors.

What is claimed is:

1. An incremental encoder comprising:
   a rotatable disc having an axis of rotation:
   a plurality of circumferentially arranged slots formed in the disc at equal angular increments;
   light source means including a light transmitting aperture so positioned on one side of the disc as to illuminate the slots;
   first light sensing means defining a first light receiving aperture positioned son the other side of the disc so as to receive light from the light transmitting aperture transmitted through the slots; and
   second light sensing means defining a second light receiving aperture positioned on the other side of the disc so as to receive from the light transmitting aperture light transmitted through the slots in quadrature phase relationship to the light received by the first sensor, the spacing between the first and second light receiving apertures being equal to ¼ the spacing between slots times the ratio of the distance between the light transmitting aperture and the light receiving apertures divided by the distance between the light transmitting aperture and the disc.

2. The encoder of claim 1, additionally comprising third light sensing means defining a third light receiving aperture positioned on the other side of the disc so as to receive light from the light transmitting aperture transmitted through the slots, the third aperture being at an angle relative to the first aperture such that the third aperture lies at the intersection of an arc having a center at the first aperture and a radius equal to the distance between the first and second apertures, and an arc having a center at the axis of rotation and a radius equal to the distance between the axis of rotation and a point between the first and second apertures.

3. The encoder of claim 2, in which the arc having a center at the axis of rotation has a radius equal to the distance between the axis of rotation and the midpoint between the first and second apertures.

4. The encoder of claim 3, in which the light source means comprises a single light source so positioned that its projection onto the disc lies at the mid-point between the first and second apertures.

5. The encoder of claim 3, in which the light source means comprises a single light source so positioned that it is equidistant from the first, second and third apertures.

6. The encoder of claim 3, in which the light source means comprises a single light source and a first slit plate disposed between the single light source and the disc, the first slit plate having at least one slit positioned to couple light directly to the slots of the disc, which slit defines the light transmitting aperture.

7. The encoder of claim 6, in which the first and second sensing means comprise first and second sensors and a second slit plate between the disc and the sensors, the second slit plate having at least two slits positioned to couple light directly to the sensors, which slits define the first and second light receiving apertures.

8. The encoder of claim 2, in which the third light receiving aperture is large enough to receive light from two adjacent slots at the same time.

9. The encoder of claim 7, additionally comprising means for generating a signal when the third sensing means receives no light.

10. The encoder of claim 1, in which the slots comprise a group of radially elongated slots arranged around only a portion of the circumference of the disc.

11. The encoder of claim 10, in which the group of slots has an end slot with a circumferentially elongated extension in the path of light from the light source means to the third sensing means.

12. The encoder of claim 11, in which the slots additionally comprise a single radially compressed slot spaced a distance from the end of the group of slots in the path of light from the source means to one of the sensing means.

13. The encoder of claim 10, in which the slots additionally comprise a first radially compressed slot positioned in the path of the light transmission to the first sensing means at an angle about the axis from the group, without transmitting light to the second and third sensing means.

14. The encoder of claim 10, in which the slots additionally comprise a radially compressed slot positioned in the path of the light transmission to the second sensing means at an angle about the axis from the group, without transmitting light to the first and third sensing means.

15. The encoder of claim 13, in which the slots additionally comprise a second radially compressed slot positioned in the path of the light transmission to the second sensing means at an angle about the axis from the group and the first sensing means, without transmitting light to the first and third sensing means.

16. The encoder of claim 15, additionally comprising a third radially compressed slot and a fourth radially compressed slot radially aligned with each other with respect to the axis in the path of light transmission to the first and second sensing means and spaced about the axis from the previously mentioned slots and the group of slots without transmitting light to the third sensing means.

17. The encoder of claim 1, in which the first and second light sensing means are unequally spaced from the axis of rotation of the disc.

18. The encoder of claim 17, in which the light source means is positioned between the first and second light sensing means.

19. A control system comprising:
   a rotatable shaft to be controlled;
   a disc mounted on the shaft to rotate therewith;
   a plurality of circumferentially arranged slots formed in the disc at equal angular increments;
   light source means so positioned on one side of the disc as to illuminate the slots;
   first light sensing means defining a first light receiving aperture positioned on the other side of the disc so as to receive light from the source means transmitted through the slots;
   second light sensing means defining a second light receiving aperture positioned on the other side of the disc farther from the axis than the first sensor so as to receive from the source means light transmitted through the slots out of phase with the light transmitted to the first sensing means;

third light sensing means defining a third light receiving aperture positioned on the other side of the disc at an angle about the axis relative to the first sensing means so as to receive light from the source means transmitted through the slots, the spacing between the first and second light receiving apertures being equal to ¼ the spacing between slots times the ratio of the distance between the light transmitting aperture and the light receiving apertures divided by the distance between the light transmitting aperture and the disc;

means responsive to the first and second sensing means for generating a control signal representative of the displacement of the shaft; and means responsive to the control signal for rotating the shaft.

20. The control system of claim 19, in which the generating means includes a bi-directional digital counter, a quadrature detector responsive to the first and second sensing means for generating signals to increment the counter for each equal angular increment of disc rotation in a direction dependent upon the relative phase of the light transmitted to the first and second sensing means, and means for resetting the counter responsive to the third sensing means.

21. The control system of claim 19 in which the first, second and third light sensing means comprise a slit plate having three slits that define the first, second and third light receiving apertures and first, second and third light sensors for receiving light passing through the first, second and third light receiving apertures respectively.

22. The control system of claim 20 in which the light source means comprises a single light source and a slit plate between the light source and the disc.

23. The encoder of claim 19, in which the light source means comprises a single light source and a first slit plate disposed between the single light source and the disc, the first slit plate having at least one slit positioned to couple light directly to the slots of the disc and to both the first and second sensing means, which slit defines the light transmitting aperture.

24. The encoder of claim 23, in which the first slit plate has another slit positioned to couple light directly to the slits and to the third sensing means.

25. The encoder of claim 24, in which the other slit is dimensioned to illuminate two adjacent slots on the disc at the same time and the third light receiving aperture is large enough to receive light from two adjacent slots on the disc at the same time.

* * * * *